United States Patent [19]

Bushman

[11] Patent Number: 5,430,448

[45] Date of Patent: Jul. 4, 1995

[54] OBJECT DETECTION SYSTEM

[75] Inventor: Boyd B. Bushman, Lewisville, Tex.

[73] Assignee: Lockheed Corporation, Fort Worth, Tex.

[21] Appl. No.: 682,470

[22] Filed: Apr. 3, 1991

Related U.S. Application Data

[63] Continuation-in-part of Ser. No. 454,165, Dec. 21, 1989.

[51] Int. Cl.6 .......... G01S 13/00; G01S 3/02; G01J 1/42
[52] U.S. Cl. .................... 342/52; 250/372; 342/56; 342/192; 342/351
[58] Field of Search ............. 342/13, 192, 351, 52, 342/56; 250/339, 342, 372

[56] References Cited

U.S. PATENT DOCUMENTS

| | | |
|---|---|---|
| 3,021,428 | 2/1962 | Mattke et al. |
| 3,053,932 | 9/1962 | Worst. |
| 3,796,396 | 3/1974 | Crovella ............... 244/3.14 |
| 3,803,595 | 4/1974 | McMillan. |
| 3,848,129 | 11/1974 | Figler et al. ........... 250/339 |
| 3,852,741 | 12/1974 | McDonald. |
| 3,944,167 | 3/1976 | Figler et al. ........... 244/3.16 |
| 4,028,544 | 6/1977 | Jourdan et al. ......... 250/203 |
| 4,234,145 | 11/1980 | Leiboff ................. 250/203 |
| 4,397,429 | 8/1983 | Fouilloy ............... 244/3.11 |
| 4,666,103 | 5/1987 | Allen .................. 244/3.13 |
| 4,773,754 | 9/1988 | Eisele ................. 356/152 |
| 4,849,620 | 7/1989 | Guerin et al. .......... 250/203 |
| 4,988,058 | 1/1991 | Dirscherl ............. 244/3.16 |
| 4,992,797 | 2/1991 | Gjessing et al. ......... 342/192 |
| 5,081,459 | 1/1992 | Guillerot et al. ........ 342/90 |

Primary Examiner—Stephen C. Buczinski
Attorney, Agent, or Firm—James E. Bradley

[57] ABSTRACT

A detection system will detect and identify self-propelled objects, such as missiles, which create a hot exhaust plume. The exhaust plume has radiation which flickers with a frequency range of interest. This frequency range can be detected with various detectors, such as an ultraviolet detector or radio frequency detector. A warning signal will indicate if frequencies are encountered within the frequency range of interest. The detecting system will also detect light and radio frequency radiation from pressure waves created by supersonic components of the flying object. This radiation has low frequency components which can be filtered and identified.

35 Claims, 5 Drawing Sheets

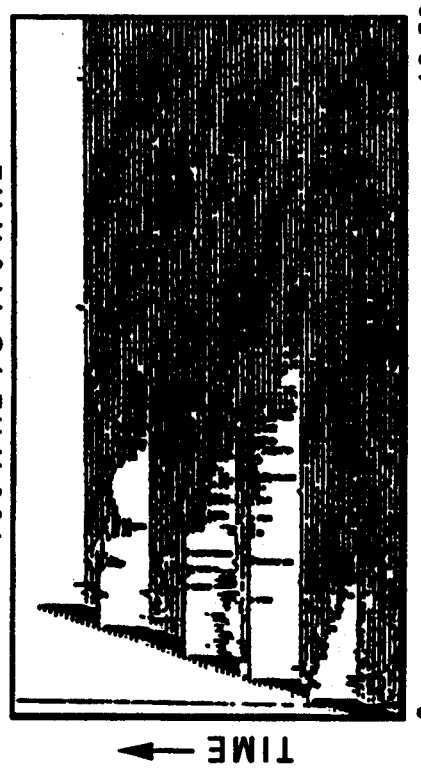
Fig. 5A
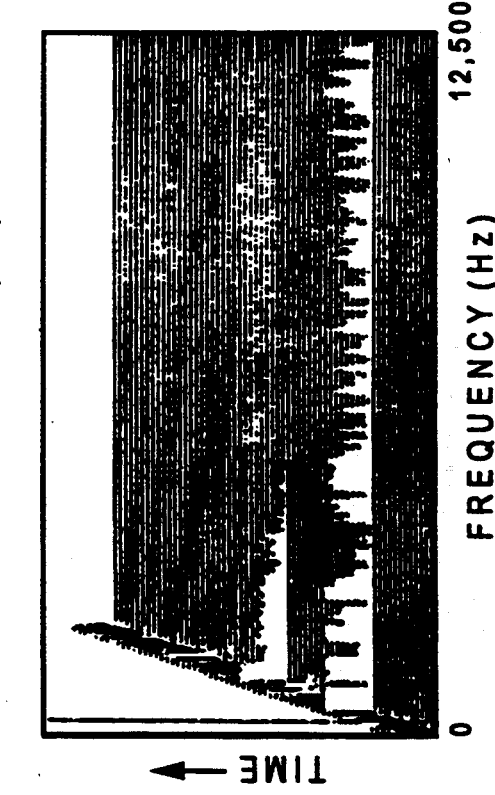
Fig. 5B
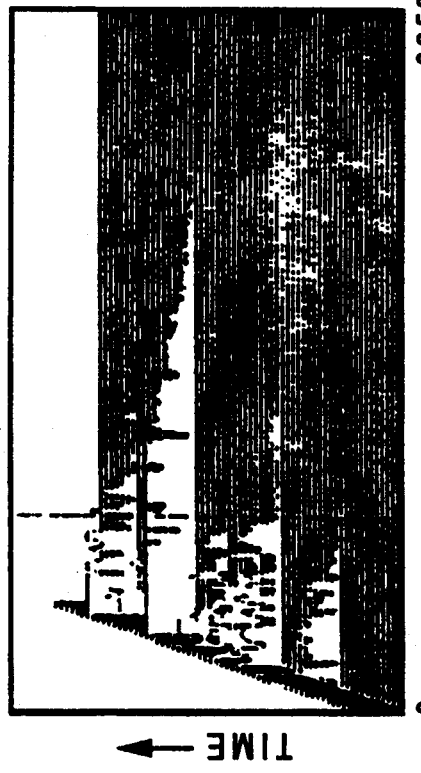
Fig. 4A
Fig. 4B

OBJECT DETECTION SYSTEM

CROSS-REFERENCE TO RELATED APPLICATION

This application is a continuation-in-part of application Ser. No. 454,165, filed Dec. 21, 1989, "Heat Radiation Detection System", Boyd B. Bushman.

BACKGROUND OF THE INVENTION

1. Field of the Invention

This invention relates in general to detecting flying objects, particularly to means for identifying the object based upon the flicker within the exhaust plume, and also based upon radiation characteristics of pressure waves created by supersonic components of the flying object.

2. Description of the Prior Art

Most military jets that are downed by an enemy are destroyed by missiles. The missiles may be either radar or infrared guided missiles. If the aircraft pilot detects the missile being fired at him, he can take counter measures. He can make tight maneuvers, and he could eject flares and metal chaff to confuse either heat or radar guided missiles.

The counter measures require that the pilot be able to detect the missile before it becomes too close for any counter measures to be taken. Once the missile is launched, the pilot has only about one second to detect it, and another two seconds to start the counter measures. Current systems do not provide adequate detection of the launching of a missile.

Modern aircraft are vulnerable to missiles because of active and passive missile guidance techniques. The missile can passively lock onto the aircraft plume, hot metal parts and/or aircraft emissions such as radar and radio. Actively, the missile can be guided to the airplane by its own radar or infrared detection unit.

The aircraft is not now warned of the oncoming missile because radar warning techniques will give away the position of the aircraft. Present infrared techniques are useless because of the extremely high number of heat sources in the battle field, each of which looks like a missile to existing infrared systems. There may be other aircraft in the area, including friendly aircraft which produce heat. Ground fire could also cause a false alarm. Even if detected, the pilot must learn of the fired missile early enough to begin his counter measures.

Another problem exists when the flame of a missile goes out. Prior art devices may be attempting to detect heat of an exhaust plume of a missile. Missiles commonly, however, will burn out before reaching their target. This detection problem exists not only for military jets, but also for defensive systems for land targets.

SUMMARY OF THE INVENTION

In this invention, a radiation detection system will detect hot gaseous plume flickers within a wide area. The detector may be mounted to the aircraft or the detector may be part of a defensive system on land. The detector will detect missile radiation that is unique to the missile plume.

Gaseous plumes from different sources have different modulation or flicker characteristics. The gases from the exhaust of self-propelled objects vibrate or flicker differently. These flickers of a gaseous plume can be detected by detectors. Missiles will have exhaust flames that vibrate at frequencies from near zero up to about 100,000 Hz (Hertz).

The radiation detection system described above also will detect radio frequency and ultraviolet light radiation that exists as a result of a pressure wave on the tip or leading edge of a component moving fast enough to create a sonic pressure wave. For example, if a missile is flying at supersonic speed, a sonic pressure wave will build up on the nose cone of the missile. This pressure wave naturally emanates radio frequency and light radiation. The radiation is at a relatively low frequency, almost to zero and as high as about 20,000 Hz. In the case of radio frequency radiation, the low frequency is a component of a high frequency carrier wave.

The same detectors can detect both the exhaust plume flicker and the radiation from the supersonic pressure wave. If a missile is detected based on radiation from its exhaust plume, frequencies over 20,000 Hz will be encountered. If the exhaust plume goes out, and if the missile is supersonic, the frequency range of interest is less than 20,000 Hz. A frequency comparator will provide an indication. If so, an automatic direction finder can locate the missile. The missile can be tracked.

Similarly, pressure waves existing from objects not necessarily flying supersonic, but having components that are near supersonic can be detected at the lower frequency range. This would include the tip of a rotating blade, such as a helicopter or a turbine blade in a jet engine.

Also, the detector can detect the pressure wave from objects that do not have exhaust plumes, such as artillery shells. Automatic direction finders for radio frequency detection can locate the object. A computer can plot a trajectory. For ultraviolet detection, preferably at least three Ground based spaced apart detectors are employed. The detectors can correlate with each other to plot a trajectory. In either case, if the trajectory is a natural parabola, then the personnel will be informed that it is an artillery shell, rather than a guided missile, which would be flying on a guided trajectory.

BRIEF DESCRIPTION OF THE DRAWINGS

FIGS. 4A and 4B are graphs illustrating frequencies detected by an ultraviolet detector of radiation from a supersonic pressure wave of a bullet fired by a rifle.

FIGS. 5A and 5B are graphs illustrating frequencies detected by a radio receiver of radiation from a supersonic pressure wave of a bullet fired by a rifle.

DETAILED DESCRIPTION OF THE INVENTION

Figure 1:
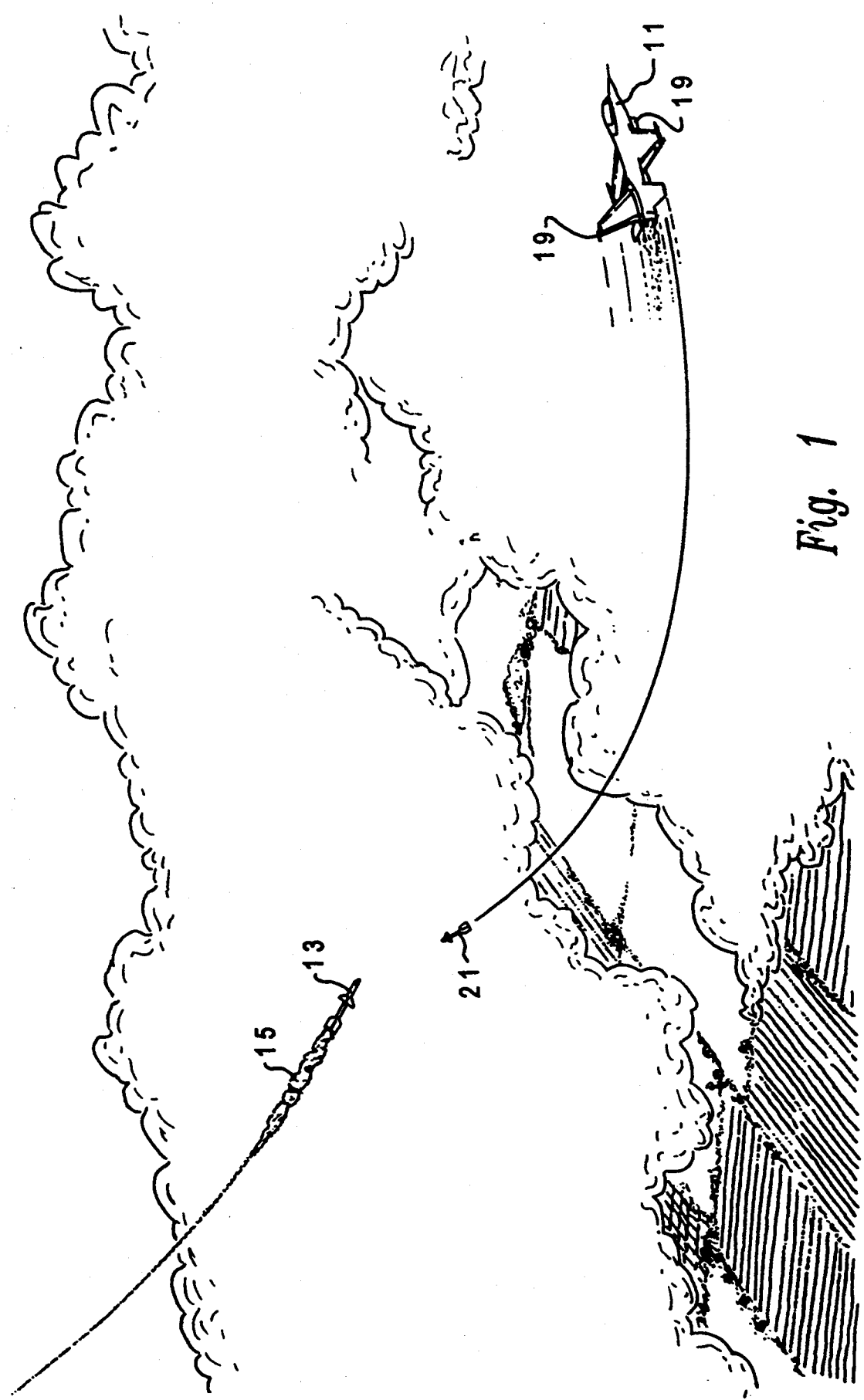
FIG. 1 is a perspective view of an aircraft being warned of the pursuit by a missile.

Referring to FIG. 1, a military jet aircraft 11 is shown being pursued by an attacking missile 13. Missile 13 may either be radar guided or guided by an infrared detector. Missile 13 will be powered by a rocket engine which discharges at least initially a hot gaseous plume 15. Plume 15 will be considerably larger in diameter than the diameter of the missile 13. In addition, it will stream behind the missile 13 a considerable distance.

Plume 15 is made up of molecules and atoms discharging at high exit velocities from missile 13. The molecules and the atoms will radiate optically and electromagnetically. Radio frequency waves will also radiate, possibly because the plume 15 becomes positively charged as a result of electrons being stripped from the atoms exiting at high velocity. The radiation will radiate in all directions.

Tests have determined that the plume 15 will flicker, similar to the flicker of a flame, but at a much higher rate. This flicker or modulation of the radiation can be detected by a detection system 19 on the aircraft 11. The detection system 19 includes an electro-optical detector, such as an ultraviolet detector. Furthermore, it could be a radio frequency receiver. It may also include an infrared detector. Normally there will be several detectors on the aircraft 11 in at least two different locations to observe in all directions.

One suitable infrared detector is a cryogenically cooled indium antimonide infrared detector. It must be cooled to about 80 degrees Kelvin. Liquid nitrogen may be employed to cool the detector if it is an infrared detector.

The detection system 19 also includes a room temperature visible and/or ultraviolet detector, such as a silicon detector. The silicon detector measures both the visible and the ultraviolet light waves. The detection system 19 also includes a radio receiver. In one test, the radio receiver carrier frequency was swept between 100 KHz and 25 MHz.

The detection system 19 will detect the flicker of the plume 15, identify it as coming from a missile 13, and provide a warning to the pilot of the aircraft 11. The pilot may take counter measures to avoid being struck by the missile 13. In addition, he may actively attack the missile 13 such as by firing an anti-missile missile 21, laser or particles.

The missile 15 will have ultraviolet and infrared detected frequencies that flicker from zero to much higher than 20,000 Hz, but less than about 100,000 Hz. The flicker frequency range of interest detected by a radio receiver is less, being less than about 1,500 Hz. Tests have shown that the flicker frequencies of a military jet exhaust, even with after burner, is less than 10,000 Hz for an optical detector and less than about 800 Hz for a radio receiver.

The frequency range of interest is obtained by connecting an infrared, ultraviolet or radio receiver detector to a Fast Fourier Transform unit and detecting a missile exhaust plume 15. The Fast Fourier Transform unit is a commercially available unit. The one employed is a Hewlett-Packard dynamic signal analyzer. It plots the frequencies encountered versus time. A separate curve at selected intervals will normally be taken, the intervals being ⅛ second apart in order to get a full view for the spectrum of frequencies that will be obtained with time.

The detection described above detects the flicker of a flame or exhaust plume. Consequently, if the missile plume ceases to exist before the missile reaches its target, which is common, the system would lose its ability to continue detecting the missile. Similarly, if the flying object is an artillery shell, the system would not detect it at all because there would be no exhaust plume. Also, if the flying object is at quite a distance and has a very small exhaust plume, perhaps the system might not be able to detect it.

Figure 2:
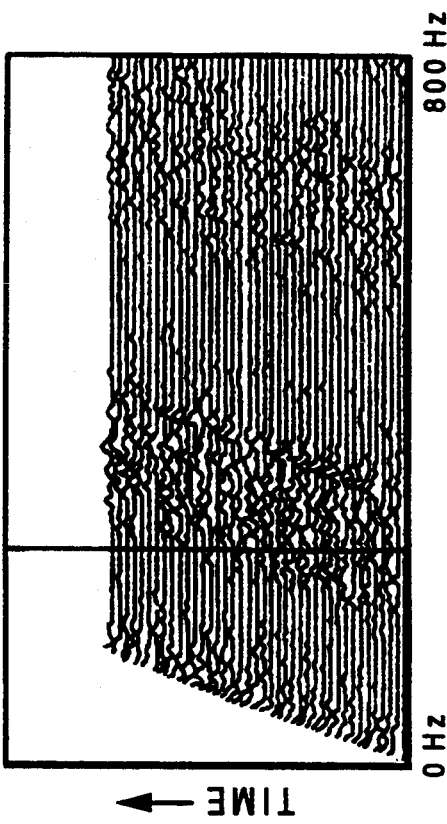
FIG. 2 is a graph illustrating frequencies detected by an ultraviolet detector of radiation from a supersonic pressure wave taken in a wind tunnel.

FIG. 2 illustrates results of a wind tunnel test. In the test an object was placed in the tunnel which was operated to create supersonic flight simulator. A sonic pressure wave formed on the nose of the object. An ultraviolet detector was used to detect any light radiation that might be emanating from the pressure wave. A Fast Fourier Transform unit was connected to the detector to plot the frequencies observed. As shown in FIG. 2, low frequencies of less than 800 Hz were observed.

Figure 3:
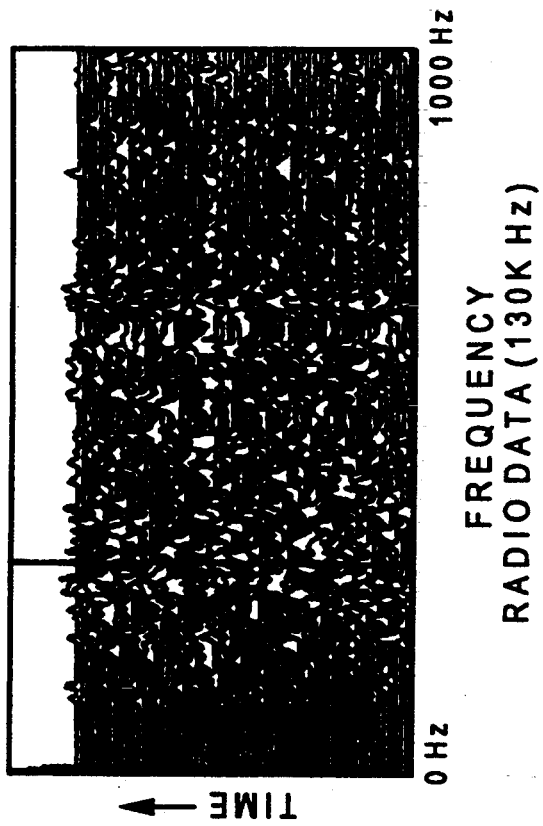
FIG. 3 is a graph illustrating frequencies detected by a radio frequency receiver of radiation from a supersonic pressure wave taken in a wind tunnel.

FIG. 3 illustrates the same test, but utilizing a radio frequency receiver. The carrier frequency was 130 KHz. Again low frequency radiation was detected, generally less than 1,000 Hz.

FIGS. 4A and 4B illustrate two separate tests made outside of a wind tunnel. In these tests, two bullets were fired from a rifle. An ultraviolet detector detected radiation emanating from the supersonic wave on the nose of the bullets. A Fast Fourier Transform unit measured the various frequencies encountered. The frequencies were low, but extended higher than those encountered in the wind tunnel. The maximum frequencies were less than 20,000 Hz. FIGS. 5A and 5B illustrate the same tests using a radio frequency receiver. Again, the frequencies encountered are less than 20,000 Hz.

Figure 6:
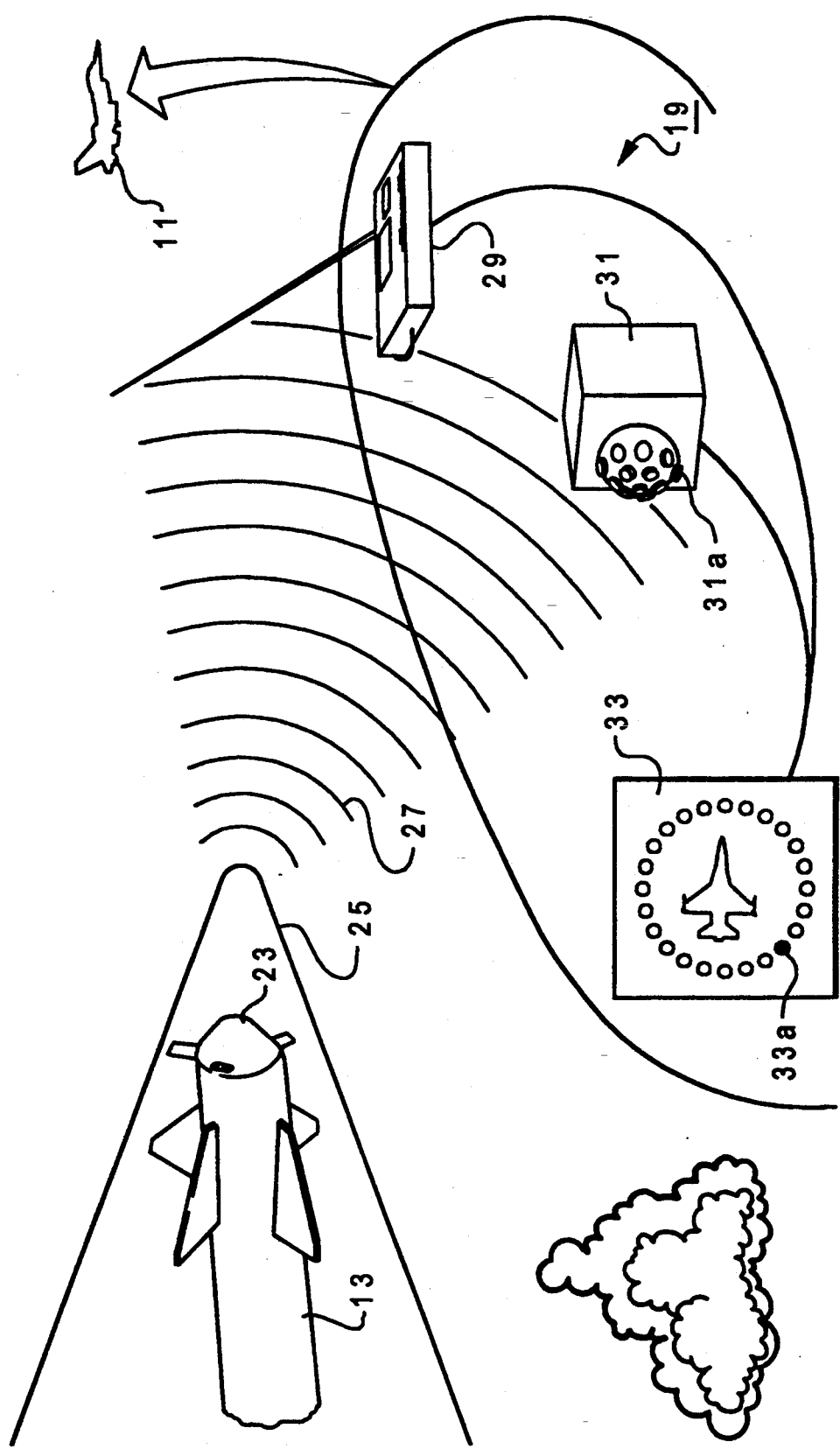
FIG. 6 is a perspective view of a supersonic missile being detected by detecting light and radio frequency radiation emanating from the pressure wave at the nose of the aircraft.

FIG. 6 illustrates how the system described above can also be utilized to detect objects utilizing the supersonic pressure wave radiation. The missile 13 has a nose 23. When flying at or near supersonic speed, a sonic pressure wave 25 will form on the leading edge of the nose 23. The pressure wave 25 will occur at near supersonic speeds and beyond Mach 1. The pressure wave 25 emits light and radio frequency radiation 27 which carries secondary low frequencies. Detection of the low frequencies permits detection and/or identification of the missile 13. The detection system 19 may be mounted to aircraft 11 or it may be located on ground.

Radiation 27 may be detected even if the object is not itself flying at a supersonic speed. If a component, such as a helicopter blade tip or a jet turbine blade tip is at near supersonic speed, the pressure wave 25 from that object also emanates light and radio frequency radiation 27. In addition, other supersonic flying objects, such as artillery shells, rifle shells and explosion particles have pressure waves 25 which can be detected.

The detection system 19 will include a radio receiver 29 which will preferably receive a wide range of carrier frequencies. Additionally, the detection system 19 includes an ultraviolet light detector 31. The detection system 19 will detect flicker frequencies of a flame or plume 15 (FIG. 6), if one exists, and will also detect radiation 27 from pressure wave 25, if the missile 13 is supersonic. Note that if the detection system 19 is mounted to airplane 11, the radio receiver 29 will not detect radiation 27 from pressure wave 25, because of interference with radiation from the exhaust of the airplane 11. The ultraviolet detector 31, however, will detect the radiation 27 from the pressure wave 25 without interference from the exhaust of airplane 11. Also, the radio receiver 29 will detect radiation from missile plume 15 (FIG. 6) without interference from airplane 11 exhaust, because of the higher frequency range.

Preferably, the receiver 29 incorporates an automatic direction finder. An automatic direction finder is a conventional component. It will identify the direction of the signal being received based on signal strength. This indicates the direction from which the missile 13 is approaching. The direction of the signal being received passes to a display 33.

The ultraviolet detector 31 determines the approaching direction of the object detected by using display 33. Ultraviolet detector 31 is made up of a number of individual detectors 31a facing different directions. The intensity of the light received by the different detectors 31a determines direction relative to the detector 31. The direction is displayed on display 33. The dark circle indicator light 33a indicates the direction of the approaching missile 13 relative to the airplane 11 on which detectors 29 and 31 are mounted.

The automatic direction finder of receiver 29 can plot a trajectory if ground based and connected to a computer. If three of the ultraviolet detectors 31 shown in FIG. 6 are utilized on land, each spaced apart from each other and connected together, a trajectory can be plotted utilizing a computer. By plotting the direction of the trajectory with time, a computer can determine whether or not the flying object 13 is approaching on a parabola. If so, it would likely be a fired projectile such as an artillery shell. The computer can determine the location of the gun firing the shell by reversing the parabola.

Figure 7:
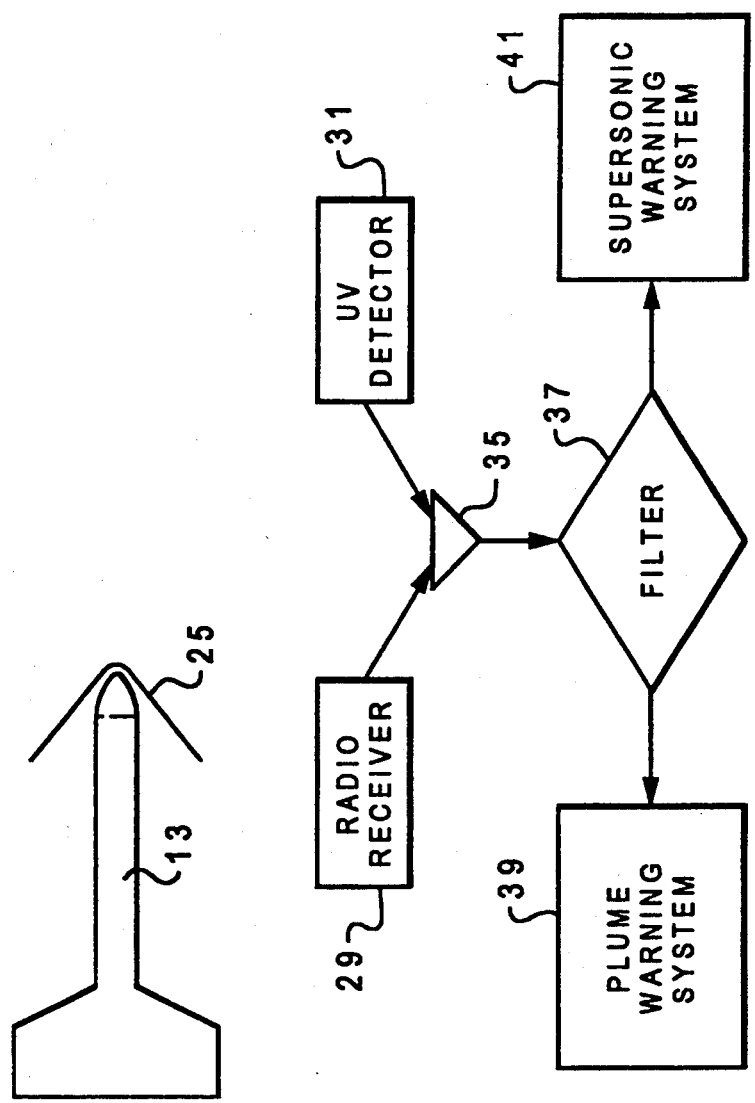
FIG. 7 is a schematic illustration of a detector system which detects both the exhaust plume of an object, and also a supersonic component of the object.
Figure 7:
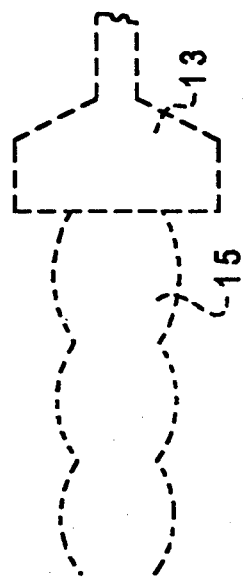

FIG. 7 illustrates detection of both an exhaust plume 15 and subsequently a pressure wave 25. While the exhaust plume 15 still exists, as shown in the dotted lines, the radio receiver 29 and ultraviolet detector 31 will detect the flicker of the exhaust plume 15. Normally, the signal strength from the exhaust plume 15 will be greater than the signal strength from pressure wave 25, if one exists.

Initially, frequencies encountered by the ultraviolet detector 31 will exceed 20,000 Hz because of the exhaust plume 15 detection. The plume 15 detection by the radio receiver 29 will have a frequency range of interest less than 1,500 Hz, but greater than 800 Hz. An amplifier 35 amplifies the signals, and in the embodiment shown, passes them to a filter circuit 37. If signals exist greater than 20,000 Hz, the filter circuit 37 actuates a plume warning system 39. This indicates that a missile 13 has been fired.

Once the missile 13 is near supersonic, the pressure wave 25 appears. Frequencies less than 20,000 Hz and due to the pressure wave 25 will also be detected by the receiver 29 and detector 31. If the plume 15 disappears, the signal less than 20,000 Hz still exists but the signal above disappears. Filter circuit 37 actuates a supersonic warning system 41. Tracking may be employed from the beginning of the detection of plume 15, and carrying on with the detection of the pressure wave 25. The tracking will determine if the object is on a parabola, or whether guided.

The detection system has significant advantages. It could require only a single passive detector. It provides a warning if a missile has been launched. It operates quickly, providing a warning signal within a less than a second of detection. The low frequencies of the detected signals give a very long range of detection.

The ability to detect light and radio frequency radiation from the pressure wave of supersonic components allows one to track objects which do not have exhaust plumes. This allows one to detect missiles after they have burned out to maintain tracking of the missile. This will provide missile warning and permit deployment of missile counter measures. The pressure wave detection system will also detect pressure waves from the near supersonic rotor blade tips of helicopters and jet engines, and will permit their identification. The shorter blades travel faster and the longer blades travel slower. This will identify the size of a helicopter because of the difference in the beat of the pressure wave coming to the sensors. In addition, it will enable one to distinguish between four-blade and five-blade helicopters.

The pressure wave detection system allows one to detect and identify shells, bullets and other high-velocity particles that do not have exhaust plumes. Triangulation is possible and the trajectory may be computed. This allows one in the battle field environment to reverse the trajectory and identify the location from where the projectile was fired.

While the invention has been shown in only one of its forms, it should be apparent to those skilled in the art that it is not so limited, but is susceptible to various changes without departing from the scope of the invention.

What is claimed is:

1. A method of detecting an object which has at least one component travelling through atmosphere at a speed sufficient to create a sonic pressure wave at a leading edge of the component, comprising:

determining a frequency range of interest at which a selected one of light and radio frequency radiation emanates from the pressure wave;

detecting at least part of the radiation emanating from the pressure wave and creating an electrical output signal having frequencies corresponding to the frequencies detected; and providing an identifying signal if frequencies are detected within the frequency range of interest.

2. The method according to claim 1 wherein the radio frequency radiation comprises low frequency components of carrier waves of much higher frequency.

3. The method according to claim 1 wherein the step of detecting includes optically detecting the radiation.

4. The method according to claim 1 wherein the step of detecting includes optically detecting the radiation with an ultraviolet detector.

5. The method according to claim 1 wherein the step of detecting includes detecting the radiation with a radio frequency receiver.

6. The method according to claim 1 wherein the frequency range of interest is less than 20,000 Hz.

7. The method according to claim 1 wherein the pressure wave is created by a nose of a flying object that is travelling at supersonic speed.

8. The method according to claim 1 wherein the pressure wave is created by a tip of a rotating blade.

9. The method according to claim 1, further comprising:

locating the flying object by determining the direction from which the radiation is emanating.

10. A method of detecting an object which has at least one component travelling through the atmosphere at a speed sufficient to create a sonic pressure wave at a leading edge of the component, comprising:

determining a frequency range of interest at which radio frequency radiation emanates from the pressure wave;

detecting the radio frequency radiation and providing an electrical output signal having frequencies corresponding to the frequencies detected; and providing an identifying signal if frequencies are detected within the frequency range of interest.

11. The method according to claim 10, further comprising: locating the flying object by determining the direction from which the radio frequency radiation is emanating.

12. The method according to claim 10 wherein the frequency range of interest is less than 20,000 Hz.

13. The method according to claim 10 wherein the pressure wave is created by a nose of a flying object that is travelling at supersonic speed.

14. The method according to claim 10 wherein the pressure wave is created by a tip of a rotating blade.

15. A method of detecting an object which has at least one component travelling through atmosphere at a speed sufficient to create a sonic pressure wave at the leading edge of the component, comprising:

determining a frequency range of interest at which ultraviolet light radiation emanates from the pressure wave;

optically detecting the light radiation with an optical detector;

creating an electrical output signal having frequencies corresponding to the frequencies of the light radiation detected; and providing a warning signal if output signals are detected within the frequency range of interest.

16. The method according to claim 15 wherein the step of optically detecting the light radiation comprises optically detecting the light radiation with an ultraviolet detector.

17. The method according to claim 15 wherein the frequency range of interest is less than 20,000 Hz.

18. The method according to claim 15 wherein the pressure wave is created by a nose of a flying object that is travelling at supersonic speed.

19. The method according to claim 15 wherein the pressure wave is created by a tip of a rotating blade.

20. The method according to claim 15, further comprising:

locating the object by determining the direction from which the radiation is emanating.

21. A method of detecting an object which has at least one component moving through atmosphere at a speed sufficient to create a sonic pressure wave at a leading edge of the component, comprising:

determining a frequency range of interest at which a selected one of light and radio frequency radiation emanates from the pressure wave;

detecting the light radiation emanating from the pressure wave and creating an electrical output signal having frequencies corresponding to the frequencies detected;

detecting the radio frequency radiation emanating from the pressure wave and creating an electrical output signal having frequencies corresponding to the frequencies detected; and providing an identifying signal if frequencies are detected within the frequency range of interest.

22. The method according to claim 21 wherein the frequency range of interest is less than 20,000 Hz.

23. The method according to claim 21 wherein the pressure wave is created by a nose of a flying object that is travelling at supersonic speed.

24. The method according to claim 21 wherein the pressure wave is created by a tip of a rotating blade.

25. The method according to claim 21, further comprising:

locating the object by determining the direction from which the radiation is emanating.

26. A method for detecting and identifying flying objects which create a hot exhaust plume, comprising:

determining a flicker frequency range of interest at which radiation in exhaust plumes of objects of that nature flicker;

detecting the radiation created by the exhaust plume and creating an electrical output signal having frequencies corresponding to the flicker frequencies of the radiation;

providing an identifying signal if frequencies are detected within the flicker frequency range of interest; and, if the exhaust plume ceases to exist while the object is still moving, and if the object has at least one component travelling through atmosphere at a speed sufficient to create a sonic pressure wave at a leading edge of the component, performing the following steps;

determining a pressure wave frequency range of interest at which a selected one of light and radio frequency radiation emanates from the pressure wave;

detecting the radiation emanating from the pressure wave and creating an electrical pressure wave output signal having frequencies corresponding to the frequencies detected; and providing an identifying signal if frequencies are detected within the pressure wave frequency range of interest.

27. The method according to claim 26 wherein the flicker frequency range of interest is in the range from 20,000 Hz to 100,000 Hz, and the pressure wave frequency range of interest is less than 20,000 Hz.

28. The method according to claim 26 wherein the step of detecting the radiation emanating from the pressure wave includes optically detecting the radiation.

29. The method according to claim 26 wherein the step of detecting the radiation from the pressure wave includes optically detecting the radiation with an ultraviolet detector.

30. The method according to claim 26 wherein the step of detecting the radiation from the pressure wave includes detecting the radiation with a radio frequency receiver.

31. The method according to claim 26 wherein the pressure wave is created by the nose of a flying object.

32. The method according to claim 26 wherein the pressure wave is created by a tip of a rotating blade.

33. The method according to claim 26 wherein the step of detecting radiation from the exhaust plume includes optically detecting the radiation.

34. The method according to claim 26 wherein the step of detecting the radiation from the exhaust plume includes optically detecting the radiation with an ultraviolet detector.

35. The method according to claim 26 wherein the step of detecting the exhaust plume radiation includes detecting the radiation with a radio frequency receiver.

* * * * *